United States Patent [19]

Richter et al.

[11] Patent Number: 4,855,116

[45] Date of Patent: Aug. 8, 1989

[54] ACTIVATED COKE METHOD OF REMOVING NITROGEN OXIDES FROM EXHAUST GASES

[75] Inventors: Ekkehard Richter; Harald Jüntgen; Hans-Jürgen Schmidt; Karl Knoblauch, all of Essen, Fed. Rep. of Germany

[73] Assignee: Bergwerksverband GmbH, Essen, Fed. Rep. of Germany

[21] Appl. No.: 2,793

[22] PCT Filed: Apr. 2, 1985

[86] PCT No.: PCT/EP86/00205

§ 371 Date: Jan. 15, 1987

§ 102(e) Date: Jan. 15, 1987

[87] PCT Pub. No.: WO86/05711

PCT Pub. Date: Oct. 9, 1986

[30] Foreign Application Priority Data

Apr. 3, 1985 [DE] Fed. Rep. of Germany ....... 3512168

[51] Int. Cl.$^4$ .................. B01J 8/00; C01B 17/00
[52] U.S. Cl. ..................................... 423/239; 423/235
[58] Field of Search .............. 423/235, 235 D, 239, 423/239 A

[56] References Cited

U.S. PATENT DOCUMENTS 2,992,895  7/1961  Feustel et al. ................ 423/239
3,917,884  11/1975  Jahn ........................ 423/445 X
4,500,501  2/1985  Hamada et al. ................ 423/239

FOREIGN PATENT DOCUMENTS 3335499  4/1985  Fed. Rep. of Germany .
58-79523  5/1983  Japan ........................ 42/239
58-133820  8/1983  Japan ........................ 423/239

OTHER PUBLICATIONS

Chemical Abstracts, vol. 82, No. 12, 76715a, Mar. 1975.

*Primary Examiner*—Gregory A. Heller
*Attorney, Agent, or Firm*—Herbert Dubno

[57] ABSTRACT

Use of activated carbon for reduction of nitric oxides with ammonia from exhaust gases using ammonia as reduction agent in the temperature range between 90°–150° C. made from hardcoal, blended with binding agents like pitch, bitumen, tar or tar oil, shaped and subjected to low-temperature carbonization with a heating rate of 20°–100° C./min to temperature between 700°–900° C. in an atmosphere containing 2–5% by vol. of oxygen, so that for the activated coke 2–8% of volatile matter and a surface of 20–150 am$^2$/g is arrived at.

5 Claims, No Drawings

ACTIVATED COKE METHOD OF REMOVING NITROGEN OXIDES FROM EXHAUST GASES

CROSS REFERENCE TO RELATED APPLICATIONS

This application is a national phase application of PCT/EP No. 86/00205 filed Apr. 2, 1986 and based, in turn, on a German National application P35112168.8 of Apr. 3, 1986.

1. Field of the Invention

Our present invention relates to a method using activated coke for removal of nitrogen oxides from exhaust gases.

2. Background of the Invention

From DE-OS No. 24 33 076 it is known that activated carbon having a specific surface (according to Brunauer, Emmett and Teller) of 200-2000 m²/g can be used for nitrogen oxide reduction by ammonia in a temperature range between 110° and 350° C. In this case the experts suppose that the activated carbons are particularly suited for the reaction because of their great internal surface. The great internal surface is arrived at by activation which can be obtained by treatment of the pre-activated, viz. the activated coke, e.g. by means of steam. Because of the activation process the costs for activated carbon production are comparably high.

In DE-OS No. 30 36 531 the use of a formed coke (activated coke) for simultaneous removal of sulphur oxides and nitric oxides from exhaust gases is described. The $SO_2$ removal results in formation of $H_2SO_4$ within the pore system of the activated coke and thus to an inhibition of the $SO_2$ loading of the coke, which means that the activated coke needs periodic thermal regeneration. In thermal regeneration the sulphuric acid is decomposed, and this decomposition involves consumption of carbon from the activated coke. This results in a widening of the pore system and an increase of the internal surface so that an activated carbon is made from the activated coke.

OBJECT OF THE INVENTION

It is an object of the invention to provide an improved process for the removal of nitrogen oxides from flue gas which can use adsorbents which catalyse the nitric oxide reduction by means of ammonia, which exihibit higher selectivIty than activated carbon, and which can be produced more inexpensively than activated carbon.

SUMMARY OF THE INVENTION

Surprisingly, where found that activated coke which is produced by oxidation of ground hardcoal, subsequently blending the oxidized coke with binders like pitch, bitumen, tar or tar oil to form shaped particles of 3-9 mm of size, and subsequent low-temperature carbonization with a heating rate of 20°-100°/min to temperatures ranging from 700° to 900° C. in an atmosphere containing 2-5% by vol. of oxygen, constitute such a suited adsorbent. These activated coke qualities have a volatile matter content of 2-8% and a specific surface of 20-150 m²/g.

With such activated coke qualities the reduction of the nitric oxides with ammonia can be effected at a temperature range between 90° and 150° C. in a much more selective way than by use of activated carbon. This may be concluded from the lower $NH_3$ consumption stated when using the improved activated coke.

Since activated coke is an intermediate product of activated carbon production, the process step of activation needs not be run and, accordingly, the activated coke is less expensive than activated carbon.

If the activated coke according to a further feature of this invention is impregnated with sodium or potassium salts, the catalytic activity of the adsorbents is further increased.

Impregnation can be carried out by known processes, e.g. by soaking in a ageneous solution and subsequent drying.

The advantages of activated coke use compared to use of activated carbon for nitric oxide reduction are described in more detail in certain specific examples below:

EXAMPLE 1

A 50 mm diameter reactor is filled with activated coke corresponding to a bed height of 100 cm. The activated coke is a product obtained from caking bituminous coal containing 20.5% of volatile matter, blended with 23 parts by weight of pitch, extruded to form 5 mm cylindrical particles, and subsequently subjected to low-temperature carbonization.

A gas flow of 1.5 m³/h (S.T.P.) consisting of 6.4% by vol. $O_2$, 9.8% by vol. $H_2O$ and the balance of $N_2$, was cycled at temperatures of 90°, 120° and 150° C. through the reactor The NO and the $NH_3$ concentrations ($C_{NO}$, $C_{NH_3}$) as well as the test results are listed in Table 1. In this trial NO conversion rates ($U_{NO}$) between 53 and 65%, according to the temperature run, were recorded. The specific $NH_3$ consumption values of 0.65 to 0.70 mol of $NH_3$ per converted mol of NO was arrived at.

TABLE 1

| Activated coke | | | | |
| --- | --- | --- | --- | --- |
| T | (°C.) | 90 | 120 | 150 |
| $C_{NO}$, in | (vpm) | 488 | 720 | 460 |
| $C_{NO}$, out | (vpm) | 229 | 290 | 161 |
| $C_{NH_3}$, in | (vpm) | 488 | 790 | 400 |
| $C_{NH_3}$, out | (vpm) | 314 | 490 | 206 |
| $U_{NO}$ | (%) | 53 | 60 | 65 |
| $\frac{\text{mol } NH_3}{\text{mol NO}}$ | $\frac{\text{mol}}{\text{mol}}$ | 0.67 | 0.70 | 0.65 |

EXAMPLE 2

In the reactor described in Example 1, activated cokes, impregnated with sodium or potassium sulphate, and calcined at 700° C. in an inert gas flow are used under identical test conditions. The results are contained in Table 2. By impregnation the catalytic activity of activated carbon is increased so that, compared to Example 1, a NO conversion rate is obtained which is 3-8% higher.

TABLE 2

| | Impregnated activated coke | | |
| --- | --- | --- | --- |
| Impregnation: | | 0.56% by wt. Na | 0.73% by wt. K |
| T | (°C.) | 120 | 120 |
| $C_{NO}$, in | (vpm) | 488 | 488 |
| $C_{NO}$, out | (vpm) | 180 | 153 |
| $C_{NH_3}$, in | (vpm) | 488 | 488 |
| $C_{NH_3}$, out | (vpm) | 288 | 262 |
| $U_{NO}$ | (%) | 63 | 68 |
| $\frac{\text{mol } NH_3}{\text{mol NO}}$ | $\frac{\text{mol}}{\text{mol}}$ | 0,65 | 0,68 |

REFERENCE EXAMPLE

A reference test using activated carbon with a internal surface (BET, DIN 66131) of 850 m²/g resulted in values listed in Table 3. Only NO conversion rates ranging between 28 and 35% are obtained. The specific $NH_3$ consumption ranges between 1.23 and 1.27 mol of $NH_3$ per converted mol of NO.

TABLE 3

| Activated carbon | | | | |
| --- | --- | --- | --- | --- |
| T | (°C.) | 90 | 120 | 150 |
| $C_{NO}$, in | (vpm) | 488 | 720 | 460 |
| $C_{NO}$, out | (vpm) | 351 | 500 | 299 |
| $C_{NH_3}$, in | (vpm) | 488 | 790 | 400 |
| $C_{NH_3}$, out | (vpm) | 317 | 510 | 202 |
| $U_{NO}$ | (%) | 28 | 31 | 35 |
| $\dfrac{\text{mol } NH_3}{\text{mol NO}}$ | mol mol | 1.25 | 1.27 | 1.23 |

These examples prove that with the use of activated coke for reduction of nitric oxides with ammonia there is a more selective conversion. The specific $NH_3$ consumption ranges between values of 0.65–0.70 mol of $NH_3$ per converted mol of NO and thus is by half lower than with use of activated carbon (1.23–1.27 mol of $NH_3$ per converted mol of NO).

We claim:

1. A method of reducing nitrogen oxides in an exhaust gas which comprises the steps of:
   (a) preparing an activated coke by
   ($a_1$) blending a hard coal powder with a binder selected from the group which consists of pitch, bitumen, tar and tar oil to form a mixture,
   ($a_2$) shaping said mixture to form individual bodies, and
   ($a_3$) subjecting said bodies to a low-temperature carbonization by heating said bodies at a rate of 20° to 100° C./min to a temperature of 700° to 900° C. in an atmosphere containing 2 to 5% by weight oxygen to produce an activated coke product having 2 to 8% volatile matter and a specific surface of 20 to 150 m²/g; and
   (b) passing an exhaust gas containing nitrogen oxides and ammonia through a bed of said activated coke product at a temperature between substantially 90° and 150° C. to effect a reduction of the nitrogen oxides by the ammonia on the activated coke product.

2. The method defined in claim 1 wherein said activated coke product is impregnated with at least one potassium or sodium salt in an amount sufficient to improve the reaction of the nitrogen oxides with the ammonia.

3. The method defined in claim 2 wherein said potassium or sodium salt is selected from the group which consists of sodium and potassium sulfate.

4. The method defined in claim 3 wherein said activated coke product is impregnated with about 0.56% Na.

5. The method defined in claim 3 wherein said activated coke product is impregnated with about 0.73% K.

* * * * *